US009922255B2

(12) United States Patent
Pandey et al.

(10) Patent No.: US 9,922,255 B2
(45) Date of Patent: Mar. 20, 2018

(54) VIDEO COUNT TO IMPROVE WIRELESS ANALYTICS ESTIMATES

(71) Applicant: Cisco Technology, Inc., San Jose, CA (US)

(72) Inventors: Santosh G. Pandey, Newark, CA (US); Anshul Tyagi, Milpitas, CA (US); Brian D. Hart, Sunnyvale, CA (US); Andrew F. Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 14/996,901

(22) Filed: Jan. 15, 2016

(65) Prior Publication Data

US 2017/0206421 A1    Jul. 20, 2017

(51) Int. Cl.
G06K 9/00      (2006.01)
G06T 7/00      (2017.01)
G06K 9/46      (2006.01)

(52) U.S. Cl.
CPC ...... *G06K 9/00711* (2013.01); *G06K 9/00778* (2013.01); *G06K 9/46* (2013.01); *G06T 7/00* (2013.01); *G06K 2009/4666* (2013.01); *G06T 2207/30196* (2013.01); *G06T 2207/30242* (2013.01)

(58) Field of Classification Search
None
See application file for complete search history.

(56) References Cited

U.S. PATENT DOCUMENTS

| 8,669,902 | B2 | 3/2014 | Pandey et al. | |
|---|---|---|---|---|
| 9,060,123 | B1 * | 6/2015 | Daniel | H04W 12/08 |
| 9,165,461 | B1 * | 10/2015 | Chu | G08G 1/0145 |
| 9,591,536 | B2 * | 3/2017 | Lei | H04W 36/08 |
| 2009/0265729 | A1 * | 10/2009 | Weinblatt | H04H 60/45 725/19 |
| 2011/0301912 | A1 | 12/2011 | Pandey et al. | |
| 2014/0089283 | A1 * | 3/2014 | Klassen | G06F 17/3087 707/706 |
| 2014/0282641 | A1 * | 9/2014 | Fry | H04N 21/44218 725/10 |

(Continued)

OTHER PUBLICATIONS

Nguyen, Dat, et al. "Video Monitoring System: Counting People by Tracking." Computing and Communication Technologies, Research, Innovation, and Vision for the Future (RIVF), 2012 IEEE RIVF International Conference on. IEEE, 2012.*

(Continued)

*Primary Examiner* — Michelle M Entezari

(74) *Attorney, Agent, or Firm* — Patterson + Sheridan, LLP

(57) ABSTRACT

Systems, methods, and computer program products to perform an operation comprising receiving, from a video monitoring system, a count of people detected at a first location, wherein the video monitoring system comprises a camera configured to capture video of the first location, receiving a count of wireless devices detected in a second location, and applying a first correction factor to the count of wireless devices detected at the second location to determine a number of people present in the second location, wherein the first correction factor is based on the count of people detected by the video monitoring system and a count of wireless devices in the first location.

15 Claims, 6 Drawing Sheets

(56) References Cited

U.S. PATENT DOCUMENTS

2014/0365644 A1 12/2014 Tanaka et al.
2015/0186957 A1* 7/2015 Barr .................. G06Q 30/0281
    705/346
2015/0351071 A1 12/2015 Pandey
2017/0017846 A1* 1/2017 Felemban .......... G06K 9/00785

OTHER PUBLICATIONS

Son, Byungrak, et al. "Development of an automatic people-counting and environment monitoring system based on wireless sensor network in real time; to realize in korea mountains." Multimedia and Ubiquitous Engineering, 2007. MUE'07. International Conference on. IEEE, 2007.*
Li, Haochao, et al. "Wi-counter: smartphone-based people counter using crowdsourced wi-fi signal data." IEEE Transactions on Human-Machine Systems 45.4 (2015): 442-452.*
Meraki, "White Paper CMX Analytics", Cisco Systems, Inc., Mar. 2015, 17 pages. <https://meraki.cisco.com/lib/pdf/meraki_whitepaper_cmx.pdf>.
Wikipedia, "Support Vector Machine", retrieved Jan. 13, 2016, 15 pages. <http://en.wikipedia.org/wiki/Support_vector_machine>.
Chang et al., "LIBSVM—A Library for Support Vector Machines", retrieved Jan. 13, 2016, 4 pages. <http://www.csie.ntu.edu.tw/~cjlin/libsvm/>.
Weston et al., "A User's Guide to Support Vector Machines", Humana Press, 2010, pp. 223-239. <http://www.cs.colostate.edu/~asa/pdfs/howto.pdf>.

* cited by examiner

VIDEO COUNT TO IMPROVE WIRELESS ANALYTICS ESTIMATES

TECHNICAL FIELD

Embodiments presented in this disclosure generally relate to wireless analytics estimates. More specifically, embodiments disclosed herein relate to using video counts to improve wireless analytics estimates.

BACKGROUND

Wireless connections established by mobile devices are often used to estimate the number of people in a specific area, such as a conference room, floor of a building, or section of a retail store. However, these estimates are often bloated by people who carry multiple wireless devices and wireless devices carried by people who are external to a building (but are able to connect to wireless access points inside the building). These factors cause wireless analytics solutions to report person counts that are higher than the number of people who are actually present in the area of interest. Similarly, using wireless devices to count people omits those people who are not carrying wireless devices. Modern video systems are able to accurately count people using a virtual "trip wire" that counts people crossing the trip wire overlaid on the video. However, providing video cameras in all locations of a store is costly.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments disclosed herein include systems, methods, and computer program products to perform an operation comprising receiving, from a video monitoring system, a count of people detected at a first location, wherein the video monitoring system comprises a camera configured to capture video of the first location, receiving a count of wireless devices detected in a second location, and applying a first correction factor to the count of wireless devices detected at the second location to determine a number of people present in the second location, wherein the first correction factor is based on the count of people detected by the video monitoring system and a count of wireless devices in the first location.

Example Embodiments

Embodiments disclosed herein leverage video data to provide a more accurate count of the people present in a given area. Specifically, wireless analytics systems disclosed herein leverage trip wire technology in video cameras to obtain more accurate counts of people in a given location. The wireless analytics systems may use the trip wire counts to enhance the accuracy of person counts made by the wireless analytics system.

For example, a retail store may have a video camera present only at the main entrance/exit of the store. The video camera may have a trip line that is used to count people entering and exiting the building, providing an accurate count of the people currently present in the store. Furthermore, the retail store may have multiple zones (or floors), each of which do not have video cameras present. However, each zone of the retail store may have wireless access points that are part of an overall wireless analytics system. The wireless analytics system may obtain a count of devices connected to a given wireless access point (the "wireless" count). The wireless analytics system may then apply a correction factor to the wireless count to obtain a corrected person count. In at least one embodiment, the correction factor for a given time t is the video count divided by the counts of wireless devices detected by the wireless access points of the zone covered by the video.

Figure 1:
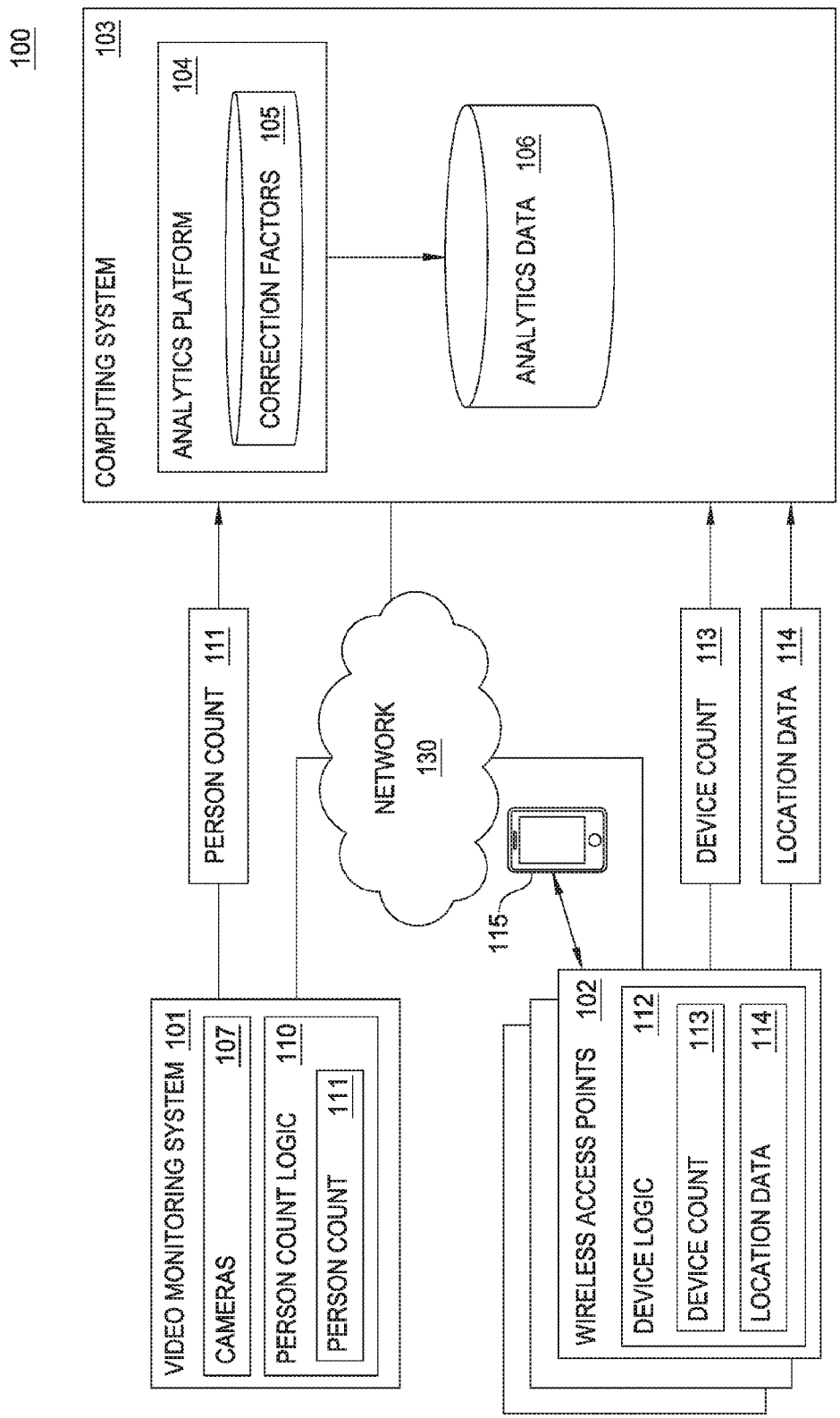
FIG. 1 illustrates a logical view of a system configured to use video count to improve wireless analytics estimates, according to one embodiment.

FIG. 1 illustrates a logical view of a system 100 configured to use video count to generate wireless analytics estimates, according to one embodiment. As shown, the system 100 includes a video monitoring system 101, a plurality of wireless access points 102, and a computing system 103 connected via a network 130. The video monitoring system 101 includes one or more video cameras 107 and person count logic 110. The cameras 107 may be stationary or affixed to a movable device, such as a vehicle or drone aircraft. The person count logic 110 of the video monitoring system 101 is configured to use a virtual "trip wire" overlaid on video data obtained from the video camera 107 to count people that cross the trip wire. In at least one embodiment, the trip wire may be situated at the entrance of a building, and the person count logic 110 derives the total number of people in the building using a running counter. For example, the person count logic 110 may compute the number of people inside the building at time t+1 as being equal to the number of people inside the building at time t (as determined by the number of people entering the building and crossing the trip wire) minus the number of inside-to-outside transitions (e.g., people leaving the building and crossing the trip wire) between time t and time t+1 plus the number of outside-to-inside transitions (e.g., people entering the building and crossing the trip wire) between time t and time t+1.

Therefore, the person count logic 110 is configured to return a person count 111 associated with a given camera 107. In at least one embodiment, the person count logic 110 provides a Representational State Transfer (REST) application programming interface (API) that can be polled by other applications (such as the analytics platform 104) to return the person count 111. In another embodiment, the person count logic 110 may use a "push" mechanism to broadcast the current person count 111 to registered applications, such as the analytics platform 104 according to a predefined timing schedule. Means for implementing the person count logic 110 include software, hardware, firmware, or any combination thereof. Furthermore, any number of techniques may be used to determine a person count 111.

The wireless access points 102 are generally wireless transceivers configured to provide wireless connectivity to wireless devices 115. The wireless access points 102 may implement any wireless protocol, such as Bluetooth® and IEEE 802.11 wireless. As shown, the wireless access points 102 include device logic 112, which is configured to return device count 113 indicating the number of wireless devices 115 currently connected to a given wireless access point 112, and the location data 114 reflecting an estimate of the location of each wireless device 115 connected to the access point 112. The device logic 112 may determine the device count 113 based on the number of unique hardware addresses (such as a media access control (MAC) address) connected to a given access point 102. The device logic 112 may leverage any technique to determine the location of a device, such as global positioning system (GPS) data, triangulation between multiple access points 112, signal strength, and the like. Although depicted as part of the wireless access points 102, in other embodiments, the device logic 112 is part of the analytics platform 104. Means for implementing the device logic 112 include software, hardware, firmware, or any combination thereof.

As shown, the computing system 103 executes an analytics platform 104 and includes an analytics data store 106. The analytics platform 104 is a solution that, among other things, uses wireless data connections to increase visibility into the network, deploy location-based mobile services, and strengthen security. One example of an analytics platform 104 is Cisco Mobility Services Engine provided by Cisco Systems, Inc. The analytics platform 104 is further configured to receive the person count 111 from the video monitoring system 101 and the device counts 113 and location data 114 from the wireless access points 102. In at least one embodiment, multiple cameras 107/video monitoring systems 101 may report respective person counts with metadata indicating the camera 107 the person count is associated with. As shown, the analytics platform 104 maintains one or more correction factors 105 that are used to determine more accurate counts of people in a given area based on the device count 113 received from an access point 102 in that area. The correction factors 105 may be specific to one or more locations. In at least one embodiment, a correction factor 105 is defined for each area that reports a person count 111 using a respective person count logic 110.

In at least one embodiment, the correction factor 105 is equal to the person count 111 reported by the person count logic 111 divided by the device count 113 from an associated wireless access point 102. Therefore, the correction factor is based on the person count logic 111 in a predefined area and a wireless access point 102 that covers (or serves) the predefined area. To determine a more accurate person count for a different area (that is not covered by a video camera), the analytics platform 104 may multiply a given device count 113 for that area by the correction factor 105. The correction factor 105 may be associated with a specific time (or a range of times), meaning that the analytics platform 104 may maintain a plurality of different correction factors for different times of day. Doing so allows more accurate estimates when more mobile devices are likely to be present, and may inflate the number of people reported based on wireless analytics.

The analytics platform 104 is configured to refine the correction factor 105 over time. In at least one embodiment, the correction factor 105 may be capped (or floored) such that the correction factor 105 remains within a range of values predefined by an administrator. As previously indicated, different areas of a building may require different correction factors 105. For example, more correction may be required for areas of a building that are near exterior walls or doors, as these areas may erroneously count wireless devices carried by people who are outside, not inside the building.

In at least one embodiment, a correction factor 105 may be computed by a manual count of the people currently present in a given area. The true number reflected by the manual count may then be used to derive the correction factor 105. For example, if 10 wireless devices are present in a first area while a manual count identifies 12 people in the first area, the correction factor 105 may be 120%. Therefore, if an access point 102 for a second area reports a device count 113 of 100 devices in the second area based on the location data 114, the analytics platform may multiply the reported devices by the correction factor to determine that 120 people are present in the second area.

Similarly, if 10 wireless devices are present in the first area, and the manual count identifies 8 people, the correction factor 105 for that area may be 80% to account for the excess wireless devices. Therefore, if the second access point 102 reports a device count 113 of 100 devices in the second location, the analytics platform may multiply the reported devices by the correction factor to determine that 80 people are present in the second area. Of course, the number of people determined to be present in a given area is an estimate, and may not correspond to the actual number of people present.

In addition, the analytics platform 104 may perform an automated calibration of the correction factors 105 for each area. The automated calibration may include determining a baseline count of people in each area when people are not expected to be present (such as when a store is closed). The analytics platform 104 may store indications of these baseline counts as "excess" counts of people, which correspond to people that may be near the location but are not actually present inside the location (or should not be counted, such as a security officer present in the store when the store is closed). Determining baseline counts may provide for more accurate person count estimates by excluding people who should not be counted and wireless devices that should not be counted. The analytics platform 104 may further calibrate the correction factors 105 by excluding certain devices that are stationary (such as printers, point of sale terminals, and the like). The analytics platform 104 may, for example, obtain a baseline count of wireless devices in a given area at a time when no people (or very few people) are expected to be in a location (such as when a store is closed). If these devices are present in their respective locations for a period of time (such as a few days), the analytics platform 104 may exclude these devices from the correction factor 105 of the respective area.

In at least one embodiment, the analytics platform 104 may assume that each person carries one wireless device. However, the analytics platform 104 may modify this assumption over time by taking long averages. For example, the analytics platform 104 may identify the number of people entering and exiting a building at different time windows, and determine the number of devices inside the building during that corresponding time window. By identifying the number of devices and the number of people in the building during that time window, the analytics platform 104 may determine an average count of devices per person for the time window. The analytics platform 104 may then average the average counts of devices per person across multiple time windows to refine the average number of devices per person in that location.

The analytics data 106 is configured to store, without limitation, the corrected person counts for each of a plurality of areas computed by the analytics platform 104. By storing the corrected person counts in the analytics data 106, the analytics platform 104 may continue to refine the correction factors 105 to provide more accurate person counts based on device counts 113 reported by the access points 102. Furthermore, the analytics platform 104 may leverage the analytics data 106 to produce reports, charts, graphs, and other content for users to reflect different types of analytics metrics.

Although the video monitoring system 101 is used as an example herein, embodiments of the disclosure apply to other techniques of counting people that can be used to define a correction factor to apply to person counts determined by connected wireless devices. For example, infrared sensors, hand held clickers, or other person counting techniques may be used. The analytics platform 104 may leverage the person counts returned by these technologies to define a correction ratio and determine a corrected person count based on the number of connected wireless devices in a given location.

Figure 2:
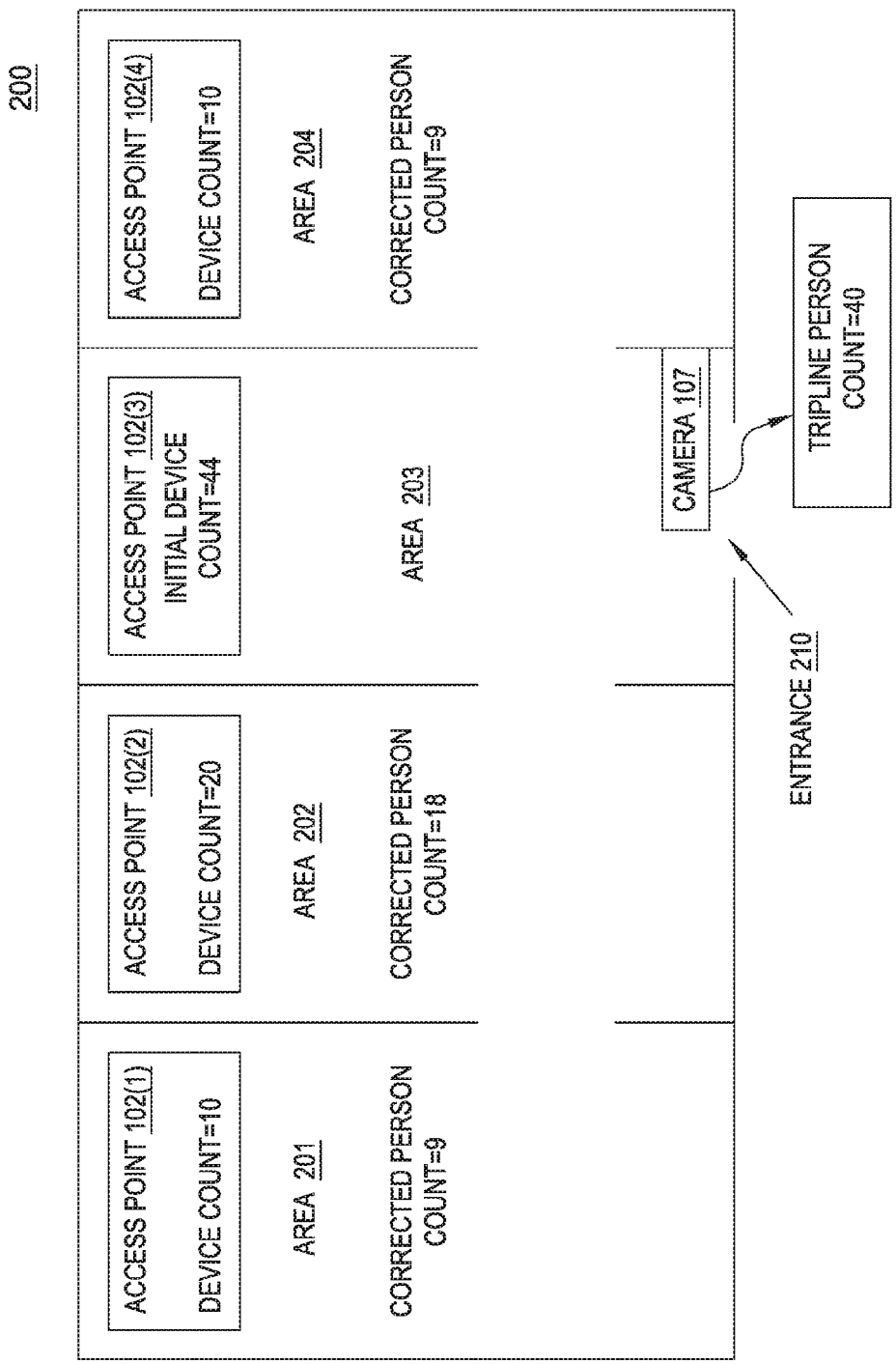
FIG. 2 illustrates an example of using video count to improve wireless analytics estimates, according to one embodiment.

FIG. 2 is a schematic illustrating an example of using video count to improve wireless analytics estimates in a building 200, according to one embodiment. As shown, the building 200 includes a single entrance 210 through which people can enter or exit. A camera 107 is situated at the entrance 210, and includes the trip wire technology that is used by the video monitoring system 101 (not pictured) to determine a current person count 111 for the building. For example, as shown, the video monitoring system 101 reports that the current person count 111 in the building is 40 people. The building 200 further includes four distinct areas, namely areas 201-204. For example, the areas 201-204 may represent aisles of a store, or different floors of the store. Each area 201-204 includes a respective access point 102(1), 102(2), 102(3), and 102(4). However, only area 203 is covered by the video camera 107, while areas 201, 203, and 204 are not covered by a respective camera 107. Therefore, the analytics platform 104 (not pictured) may use the device counts reported by each access point 102(1), 102(2), and 102(4), and apply a correction factor 105 for each area to determine a corrected person count for areas 201, 203, and 204.

To determine the correction factor 105, the analytics platform 104 may identify the person count of 40 people reported by the video monitoring system 101 associated with the camera 107 at the entrance 210. The analytics platform 104 may then determine an initial device count from the access point 102(3), which is associated with the area 203 (as is the video camera 107). As shown, the initial device count reported by the access point 102(3) is 44 devices. Therefore, the analytics platform 104 may divide the person count of 40 by the device count of 44, resulting in a correction factor of approximately 91%. The analytics platform 104 may use the correction factor of 91% to subsequently approximate the number of people in areas 201, 202, and 204.

As shown, each access point 102(1), 102(2), and 102(4) reports a respective device count reflecting the number of devices currently connected to the access point 102. Specifically, access point 102(1) reports that 10 devices are connected, access point 102(2) reports that 20 devices are connected, and access point 102(4) reports that 10 devices are connected. As shown, the analytics platform 104 may compute a corrected person count for each area 201, 202, and 204.

Therefore, as shown, area 201 has a corrected person count of 9 people, less than the device count of 9 people, while area 202 has a corrected person count of 18, less than the device count of 20. Similarly, area 204 has a corrected person count of 9, less than the device count of 10. Note, the corrected person counts are rounded to the nearest whole number. Therefore, in computing the corrected person counts, the analytics platform 104 ignores multiple devices carried by some people, devices external to the building, and stationary devices within the building. Similarly, in computing the corrected person counts, the analytics platform 104 considers people who do not carry mobile devices at all.

Figure 3:
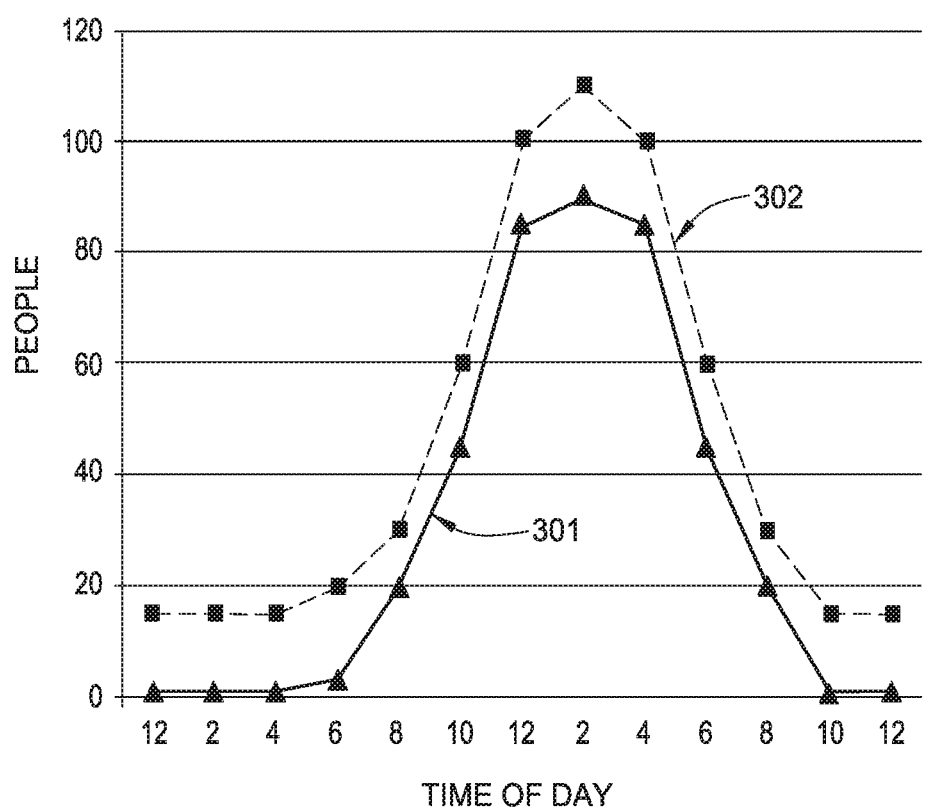
FIG. 3 illustrates an example output of using video count to improve wireless analytics estimates, according to one embodiment.

FIG. 3 illustrates an example graph output 300 generated by the analytics platform 104 using video count to improve wireless analytics estimates, according to one embodiment. The x-axis of the graph 300 corresponds to a time of day (in 2 hour intervals), while the y-axis corresponds to a count of people in a given location (such as a one of the areas 201-204 of the building 200, or the combined person counts of all areas 201-204). As shown, the graph 300 includes two curves 301, 302. The curve 301 corresponds to a person count that does not consider the respective correction factor 105. The curve 302 corresponds to a corrected person count that considers the correction factor 105. As shown, the graph 300 reflects that more people are present in the location than would be traditionally determined using wireless analytics. While the curve 302 reflects greater person counts than the curve 301, this need not be the case. For example, the curve 301 may have equal or greater person counts than the curve 302 at a given time. The curves 301, 302, therefore, are exemplary and should not be considered limiting of the disclosure.

Figure 4:
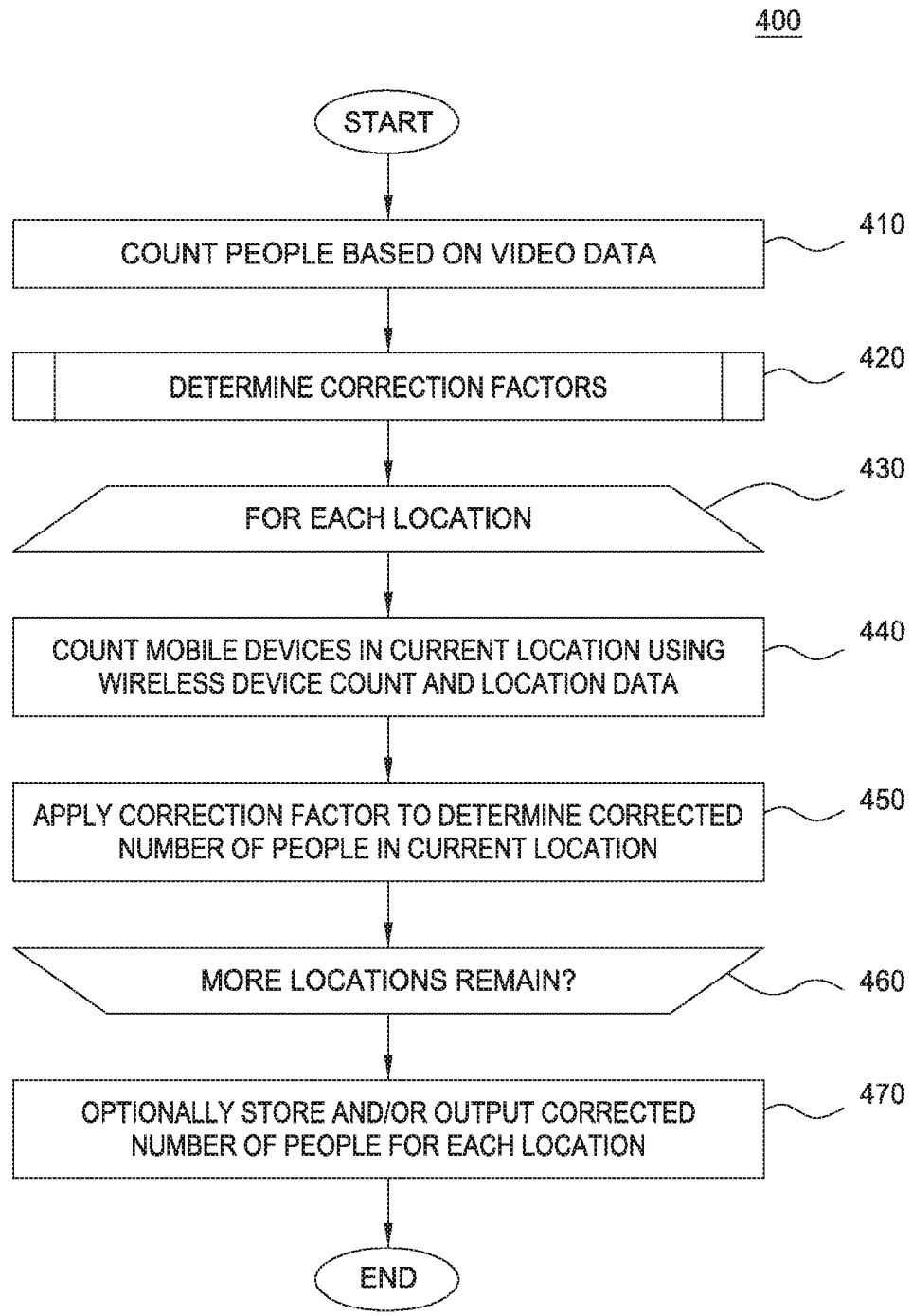
FIG. 4 is a flow chart illustrating a method to use video count to improve wireless analytics estimates, according to one embodiment.

FIG. 4 is a flow chart illustrating a method 400 to use video count to improve wireless analytics estimates, according to one embodiment. As shown, the method 400 begins at block 410, described in greater detail with reference to FIG. 5, where the video monitoring system 101 may count people in at least one area based on video data taken from the at least one area. For example, the video monitoring system 101 may implement trip wire technology to maintain a running count of people that are currently in a location, and provide the count of people to the analytics platform 104. At block 420, a user or the analytics platform 104 determines at least one correction factor based on the person counts from the video data. In at least one embodiment, each correction factor is based on a respective person count obtained from a video trip wire divided by a wireless device count provided by a wireless access point in the same area covered by a video monitoring system. The correction factors may be specific to a time of day and/or a given location. At block 430, the analytics platform 104 executes a loop including blocks 440-450 for each location where person counts are desired, such as each area surrounding a wireless access point 102.

At block 440, the access point(s) 102 associated with the current area may count mobile devices connected thereto, and provide the count of mobile devices and/or location data of the devices to the analytics platform 104. In at least one embodiment, the number of devices are counted based on the number of unique hardware identifiers (such as MAC addresses) connected to a given access point 102. In at least one embodiment, the analytics platform 104 may count the number of devices connected via a given access point 102 based on data provided by the access point 102. The analytics platform 104 and/or an access point 102 may refine the count of devices based on a threshold distance from an access point 102. For example, if the threshold is a 10 meter radius around an access point 102, and the location data (such as GPS coordinates) of wireless device X indicate wireless device X is 11 meters away from the access point 102, wireless device X would not be counted as being connected to the access point 102 in such an example.

At block 450, the analytics platform 104 may apply the correction factor 105 corresponding to the current location (and time of day, if applicable) to determine a corrected number of people in the current location. At block 470, the analytics platform 104 determines whether more locations remain. If more locations remain, the method 400 returns to block 430, otherwise, the method proceeds to block 470. At block 470, the analytics platform 104 may optionally store and/or output the corrected numbers of people computed for each location at step 450.

Figure 5:
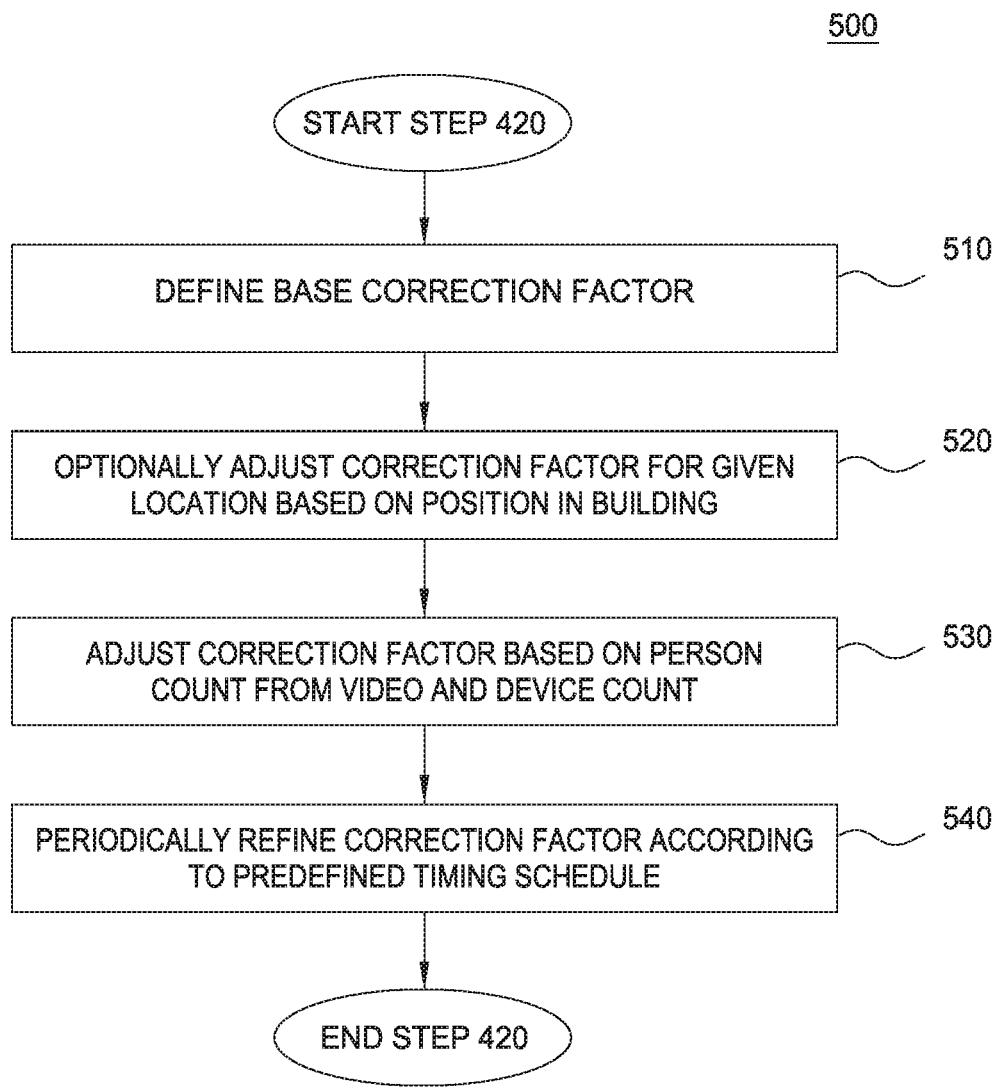
FIG. 5 is a flow chart illustrating a method to define a correction factor, according to one embodiment.

FIG. 5 is a flow chart illustrating a method 500 corresponding to block 410 to determine correction factors, according to one embodiment. Generally, the analytics platform 104 or a user may implement method 500 to determine correction factors for a plurality of different areas (or locations). The correction factors may be associated with a time of day, whereby a given location may have multiple correction factors based on the time of day. For example, a business located near a school may have a correction factor that is designed to exclude device counts triggered when students are going to or from school in the mornings or afternoons, respectively. Doing so excludes devices (and the associated people) that should not be counted by the analytics platform 104, even though the students may pass by the exterior of the business on their way to or from school.

As shown, the method 500 begins at block 510, where a user or the analytics platform 104 may define a base correction factor for a given location. In one embodiment, the base correction factor may be determined by a manual count of people in the location which is provided to the analytics platform 104 as input. In another embodiment, the analytics platform 104 may count devices that are present in the location at predefined times (such as when a store is closed and few people are present), and define a base correction factor that considers the presence of stationary wireless devices (such as printers). At block 520, the analytics platform 104 or a user may optionally adjust the correction factor based on a location's position in a building. For example, locations at the exterior of a building may pick up wireless signals from people who are walking past the building. The analytics platform 104 may therefore modify the correction factor such that these devices are not considered when counting devices based on connected wireless devices. At block 530, the analytics platform 104 adjusts the correction factor based on the current number of people determined by the video monitoring system 101 and the number of wireless devices connected to a corresponding access point 102. For example, the adjusted correction factor may be based on the person count from the video monitoring system divided by the number of wireless devices connected to the access point. The number of devices used in adjusting the correction factor may exclude stationary wireless devices and/or the number of wireless devices which may be connected to the access point, but, for example, are external to the building. At block 540, the analytics platform 104 may periodically refine the correction factor for each location according to a predefined timing schedule.

Figure 6:
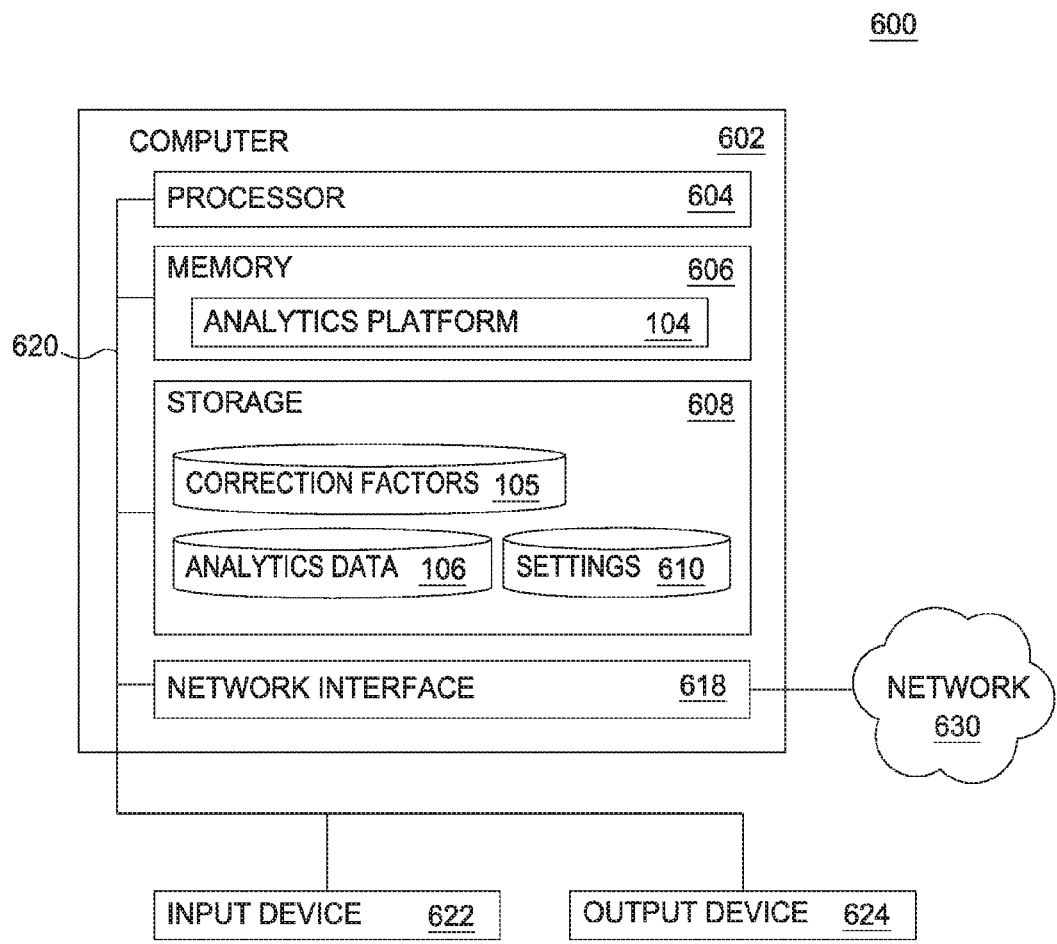
FIG. 6 is block diagram illustrating a system configured to use video count to improve wireless analytics estimates, according to one embodiment.

FIG. 6 is block diagram illustrating a system 600 configured to use video count to improve wireless analytics estimates, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the analytics platform 104, which was described in greater detail above. Similarly, the storage 608 contains the correction factors 105, the analytics data 106, and settings 610. The settings 610 may store the configuration information for the analytics platform 104, such as predefined thresholds, baseline device or person counts, and the like. Generally, the computer 602 is configured to implement all methods, techniques, and apparatuses described in FIGS. 1-5.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the analytics platform 104 could execute on a computing system in the cloud and define correction factors for each of a plurality of areas that provide wireless connectivity. In such a case, the analytics platform 104 could apply the correction factor to wireless device counts to determine corrected person counts, and store the corrected person counts at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining a base correction factor for a structure based on a count of stationary wireless devices in the structure;
   receiving, from a video monitoring system based on a virtual trip wire, a count of people detected at a first location of the structure, wherein the video monitoring system comprises a camera configured to capture video of the first location of the structure and not capture video of a second location of the structure;
   receiving a respective count of wireless devices detected by a first wireless access point in the first location of the structure and a second wireless access point in the second location of the structure;
   determining a first correction factor for the first location of the structure based at least on:
      the base correction factor,
      the count of people detected at the first location, and
      the count of wireless devices detected at the first location;
   determining a second correction factor for the second location of the structure based at least on:
      the base correction factor,
      the count of people detected at the first location, and
      the count of wireless devices detected at the second location;
   applying the first correction factor to the count of wireless devices detected at the first location to determine a modified number of people present in the first location; and
   applying the second correction factor to the count of wireless devices detected at the second location to determine a modified number of people present in the second location, wherein the modified number of people improves estimates of people present in the first and second locations relative to estimating based on the counts of wireless devices.

2. The method of claim 1, wherein the first correction factor comprises the count of people detected at the first location divided by the count of wireless devices detected in the first location, wherein the second correction factor comprises the count of people detected at the first location divided by the count of wireless devices detected in the second location wherein the first and second locations are different areas of the structure.

3. The method of claim 2, wherein applying the first and second correction factors excludes the set of stationary wireless devices from the modified numbers of people present in the first and second locations.

4. The method of claim 3, wherein each of a plurality of units of time are associated with a respective correction factor, of a plurality of correction factors, wherein the plurality of correction factors comprise the base correction factor, the first correction factor, and the second correction factor.

5. The method of claim 4, wherein the second location is proximate to an exterior wall of the structure, wherein the second correction factor is configured to ignore, when determining the modified number of people in the second location, a set of wireless devices situated outside of the structure and connected to the second wireless access point.

6. A system, comprising:
   a video monitoring system configured to determine a count of people present in a first location of a structure based on a virtual trip wire, wherein the video monitoring system comprises a camera configured to capture video of the first location of the structure and not capture video of a second location of the structure;
   a first wireless access point in the first location and a second wireless access point in the second location; and
   an analytics platform configured to perform an operation comprising:
      determining a base correction factor for the structure based on a count of stationary wireless devices in the structure;
      receiving, from the video monitoring system, the count of people detected at the first location;
      receiving, from the first and second wireless access points, a count of wireless devices detected at the first and second locations, respectively;
      determining a first correction factor for the first location of the structure based at least on:
         the base correction factor,
         the count of people detected at the first location, and
         the count of wireless devices detected at the first location;
      determining a second correction factor for the second location of the structure based at least on:
         the base correction factor,
         the count of people detected at the first location, and
         the count of wireless devices detected at the second location;
      applying the first correction factor to the count of wireless devices detected at the first location to determine a modified number of people present in the first location; and
      applying the second correction factor to the count of wireless devices detected at the second location to determine a modified number of people present in the second location, wherein the modified number of people improves estimates of people present in the first and second locations relative to estimating based on the counts of wireless devices.

7. The system of claim 6, wherein the first correction factor comprises the count of people detected at the first location divided by the count of wireless devices detected in the first location, wherein the second correction factor comprises the count of people detected at the first location divided by the count of wireless devices detected in the second location wherein the first and second locations are different areas of the structure.

8. The system of claim 7, wherein applying the first and second correction factors excludes the set of stationary wireless devices from the modified numbers of people present in the first and second locations.

9. The system of claim 8, wherein each of a plurality of units of time are associated with a respective correction factor, of a plurality of correction factors, wherein the plurality of correction factors comprise the base correction factor, the first correction factor, and the second correction factor.

10. The system of claim 9, wherein the second location is proximate to an exterior wall of the structure, wherein the second correction factor is configured to ignore, when determining the modified number of people in the second location, a set of wireless devices situated outside of the structure and connected to the second wireless access point.

11. A computer program product, comprising:
a non-transitory computer-readable storage medium storing instructions which when executed by a processor performs an operation comprising:
determining a base correction factor for a structure based on a count of stationary wireless devices in the structure;
receiving, from a video monitoring system based on a virtual trip wire, a count of people detected at a first location of the structure, wherein the video monitoring system comprises a camera configured to capture video of the first location of the structure and not capture video of a second location of the structure;
receiving a respective count of wireless devices detected by a first wireless access point in the first location of the structure and a second wireless access point in the second location of the structure;
determining a first correction factor for the first location of the structure based at least on:
the base correction factor,
the count of people detected at the first location, and
the count of wireless devices detected at the first location;
determining a second correction factor for the second location of the structure based at least on:
the base correction factor,
the count of people detected at the first location, and
the count of wireless devices detected at the second location;
applying the first correction factor to the count of wireless devices detected at the first location to determine a modified number of people present in the first location; and
applying the second correction factor to the count of wireless devices detected at the second location to determine a modified number of people present in the second location, wherein the modified number of people improves estimates of people present in the first and second locations relative to estimating based on the counts of wireless devices.

12. The computer program product of claim 11, wherein the first correction factor comprises the count of people detected at the first location divided by the count of wireless devices detected in the first location, wherein the second correction factor comprises the count of people detected at the first location divided by the count of wireless devices detected in the second location wherein the first and second locations are different areas of the structure.

13. The computer program product of claim 12, wherein applying the first and second correction factors excludes the set of stationary wireless devices from the modified numbers of people present in the first and second locations.

14. The computer program product of claim 13, wherein each of a plurality of units of time are associated with a respective correction factor, of a plurality of correction factors, wherein the plurality of correction factors comprise the base correction factor, the first correction factor, and the second correction factor.

15. The computer program product of claim 14, wherein the second location is proximate to an exterior wall of the structure, wherein the second correction factor is configured to ignore, when determining the modified number of people in the second location, a set of wireless devices situated outside of the structure and connected to the second wireless access point.

* * * * *